US012131391B2

(12) United States Patent
Nash et al.

(10) Patent No.: US 12,131,391 B2
(45) Date of Patent: Oct. 29, 2024

(54) SYSTEMS AND METHODS TO ORGANIZE DATA FROM MULTIPLE PLATFORMS WITH NON-TRANSITORY COMPUTER-READABLE MEDIA AND DATA ORGANIZING METHODS

(71) Applicant: Seize LLC, Cerritos, CA (US)

(72) Inventors: Taber Frederick Nash, La Palma, CA (US); Anthony William Underwood, Grand Rapids, MI (US); Matthew James Wolinski, Littleton, CO (US); Parker J. Feyen, Laguna Beach, CA (US); Anthony Edward Arnold, La Palma, CA (US)

(73) Assignee: Seize LLC, Cerritos, CA (US)

( * ) Notice: Subject to any disclaimer, the term of this patent is extended or adjusted under 35 U.S.C. 154(b) by 66 days.

(21) Appl. No.: 17/508,794

(22) Filed: Oct. 22, 2021

(65) Prior Publication Data

US 2022/0129996 A1    Apr. 28, 2022

Related U.S. Application Data

(60) Provisional application No. 63/104,365, filed on Oct. 22, 2020.

(51) Int. Cl.
*G06Q 50/00* (2024.01)
*G06F 3/04842* (2022.01)
*G06Q 10/1093* (2023.01)

(52) U.S. Cl.
CPC ......... *G06Q 50/01* (2013.01); *G06F 3/04842* (2013.01); *G06Q 10/1093* (2013.01)

(58) Field of Classification Search
CPC ............... G06Q 50/01; G06Q 10/1093; G06F 3/04842; G06F 3/04847
See application file for complete search history.

(56) References Cited

U.S. PATENT DOCUMENTS

| | | | |
|---|---|---|---|
| 9,117,204 B2* | 8/2015 | Hubner | G06Q 10/1093 |
| 10,121,123 B1* | 11/2018 | Gomersall | G06Q 10/1093 |
| 10,200,877 B1* | 2/2019 | Skidmore | H04W 16/22 |
| 11,282,042 B2* | 3/2022 | Bhattacharya | G06N 20/00 |
| 11,907,910 B2* | 2/2024 | Libin | G06Q 10/1095 |
| 2003/0191772 A1 | 10/2003 | Schaumann et al. | |
| 2009/0255153 A1* | 10/2009 | Mori | G09D 3/12 40/107 |

(Continued)

FOREIGN PATENT DOCUMENTS

WO    2013091068 A1    6/2013

*Primary Examiner* — Florian M Zeender
*Assistant Examiner* — Karma A El-Chanti
(74) *Attorney, Agent, or Firm* — Ice Miller LLP

(57) ABSTRACT

Systems and methods for dynamically displaying aggregated social media/calendar content in a graphical user interface (GUI) include displaying a date selector configured to retrieve an input from a user, the input including information about a selected date of interest to the user displaying graphical element corresponding respectively to user content containing retrieved first social media/calendar content, other user content containing retrieved second social media/calendar content, and aggregated social media/calendar content based on the first and second modified social media/calendar content. The graphical elements are displayed within respective portions of the GUI on a computer screen.

21 Claims, 8 Drawing Sheets

(56) References Cited

U.S. PATENT DOCUMENTS

| | | | | |
|---|---|---|---|---|
| 2014/0036639 A1* | 2/2014 | Boni | G06Q 10/1093 | 368/29 |
| 2014/0200942 A1* | 7/2014 | Benjamin | G06Q 10/1093 | 705/7.18 |
| 2014/0372846 A1* | 12/2014 | Bouknight, Jr. | G06F 40/289 | 715/205 |
| 2015/0046370 A1* | 2/2015 | Libin | G06Q 10/10 | 705/345 |
| 2015/0269531 A1* | 9/2015 | Menayas | G06F 3/0485 | 705/7.18 |
| 2016/0140508 A1 | 5/2016 | Ossia et al. | | |
| 2016/0363911 A1* | 12/2016 | Belitsky | G04G 21/00 | |
| 2017/0091713 A1* | 3/2017 | Paris | G06Q 10/1093 | |
| 2019/0005458 A1* | 1/2019 | Mallipudi | G06Q 10/1093 | |
| 2019/0108491 A1* | 4/2019 | Albertine | G06Q 50/01 | |
| 2019/0208289 A1* | 7/2019 | Singh | H04N 21/8547 | |
| 2019/0213557 A1* | 7/2019 | Dotan-Cohen | H04L 67/535 | |
| 2019/0279139 A1* | 9/2019 | Hofer | G06F 3/04847 | |
| 2020/0364673 A1* | 11/2020 | Engrav | G06Q 10/0631 | |
| 2021/0004769 A1* | 1/2021 | McVey | H04L 12/1818 | |
| 2021/0133693 A1* | 5/2021 | Holmes | G06F 21/123 | |
| 2021/0158304 A1* | 5/2021 | Waldman | G06Q 10/109 | |
| 2021/0192461 A1* | 6/2021 | Waldman | G06F 3/04847 | |
| 2021/0248562 A1* | 8/2021 | Glatfelter | G06Q 50/01 | |
| 2021/0264377 A1* | 8/2021 | Ebner | G06Q 10/1093 | |
| 2022/0129996 A1* | 4/2022 | Nash | G06Q 10/1093 | |

* cited by examiner

SYSTEMS AND METHODS TO ORGANIZE DATA FROM MULTIPLE PLATFORMS WITH NON-TRANSITORY COMPUTER-READABLE MEDIA AND DATA ORGANIZING METHODS

CROSS-REFERENCE TO RELATED APPLICATION

The present application claims priority to U.S. Provisional Patent Application Ser. No. 63/104,365, filed on Oct. 22, 2020, which is incorporated in its entirety herein.

BACKGROUND

Social media permits the exchange of information, ideas, interests, and other forms of expression via online communities and networks, but pose a number of significant challenges in parsing and relaying information sourced from separate users. Generally, social media users create separate profiles and feeds. User-generated content, such as posts or comments are conventionally displayed in the user's feed that other users can view with limited ability to interact or corroborate. Moreover, a user's individual feed may contain incomplete or imprecise information due to omissions in the user's memory of a particular topic.

For example, a user may want to memorialize an event in his or her lifetime on a social media network (e.g., FACEBOOK, INSTAGRAM, MYSPACE, TWITTER, etc.). However, the user may not have sufficient time or information to realize a meaningful social media post. In a lifetime, these omissions can impose substantial challenges to a user's ability to provide a sustained narrative. Conventional social media networks are constrained in their ability to draw from other users' resources to aid collaboration and realization of meaningful content.

SUMMARY OF THE INVENTION

Systems and methods to organize data from multiple platforms are disclosed herein to merge users' memory cues from many sources, including from an individual user's various social network accounts, in addition to those of other related users, such as the user's cohorts, colleagues, relatives, peers. The systems and methods (also referred to herein as "Paths") permit users to merge their online/offline memory cues from many sources. The Paths systems and methods additionally enable friends and family to easily link and add material to each memory (and vice versa) to expand on the content. Additionally, The Paths systems and methods provides easy access and organization to each user by automatically intermingling and aligning one or more users' improved life legacies, which may be maintained in perpetual collaboration.

The Paths systems and methods gather and organize otherwise disjointed artifacts from a user's digital footprint (among disparate social media networks), into a simple, single safehouse, where the constructed legacy may remain permanently. Paths imports memories from third party networks and platforms in order to centralize all the fragmented pieces of life history.

According to some embodiments, a Paths "PastPuller" module imports old memory cues so the user can reach out and ask another user whether they remember a given event. One or more collaborative users may proceed to add their memories to the user's content, such that aggregated content is available for both to review and share.

According to some embodiments, Paths links all social posts from various platforms to the same event/topic between friend/family cliques so moments are cherished in greater detail from one-or-more perspectives that can be tabbed-through. One distinction from conventional social media networks is that posts on Paths are co-owned, so the group collaborates on capturing a memory beyond photos and captions. Paths merges given loved one's like entries into a shared co-post, referred to herein as a "CollabTab." According to some embodiments, the Paths systems and methods permit parties to include (e.g., add) more people and content to a given memory over time. Paths enables the depth of a user's existence and legacy to grow over time, even in the absence of the users. The Paths systems and methods achieve advantages that are otherwise unrealized by conventional social media, providing a platform that facilitates the creation of a user's narrative through automated intermingling to cure gaps in a user's content. Thus, a complete and precise narrative may be generated through simplified corroboration even when the user lacks perfect information and/or resources According to some embodiments, Paths enables rapid access to past memories, current moments and future ambitions. Paths will offer multiple data visualization interfaces, including multiple versions of the Tandem Timeline in order to allow easy access to any point in a life, while referencing the important memories of friends & family—in relationship to the users simultaneously. With Paths, mutually appreciating the past is the same practice as setting and sharing future goals. The Paths Tandem Timeline enables users to efficiently navigate and chronicle a body of work and experiences over a lifetime, side-by-side with the people (e.g., other users) that shared in these experiences.

Paths makes daily social media time more meaningful as it contributes to a final legacy which includes a user's intermingled and aligned content regarding relationships, experiences, lessons, gratitude, goals and media. Paths transcends conventions of traditional social media by mapping and combining stored content and insights toward an efficient and meaningful narrative to provide a fuller legacy.

BRIEF DESCRIPTION OF THE DRAWINGS/FIGURES

DETAILED DESCRIPTION OF THE INVENTION

Embodiments described herein improve social media collaboration utilizing Paths systems and methods. Specifically, embodiments described herein improve aggregation and collaboration of social media/calendar content. Where conventional social media/calendar content may have only one owner/creator, Paths permits and facilitates entries having multiple co-owners, i.e., a "PostHost" user who originates the post and one or more "PostGuests" that can be invited by the PostHost into the post.

Therefore a post on Paths consists of one or more entries that collaborate and form a single post. Entries are created when a user either creates new content from scratch or imports the content from an outside source such as a blog, social network, calendar or any other third party integration. "PastPulling" refers to importing of third party content for aligning with the like content of others. According to some embodiments, a "PastPuller" feature pulls one's historical data into Paths to be aligned and intertwined with the life data of users who choose to mesh with each other.

Like any posts, posts on Paths cascade down a feed for viewing preview, then the user can navigate through the previewed feed object to see greater detail of the post, including the entries. So, one distinction over conventional social media is that posts in the Paths systems and methodologies can be "co-owned" by multiple contributors who may add an entry, each of which have a tab that appears horizontally across the top of a Paths post. The Paths systems and methods can include a CollabTab collaborative interface element, a unique tab-based navigation item that allows users to toggle between collaborative co-contributors to a Paths social post, resulting in co-ownership of a post.

Details within an user's entry are standardized into "media blocks" that contain common data types such a title, images/videos, text description, audio, but also featuring unique content elements, such as a Teachable Takeaway and/or Gratitude Journal content modules.

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
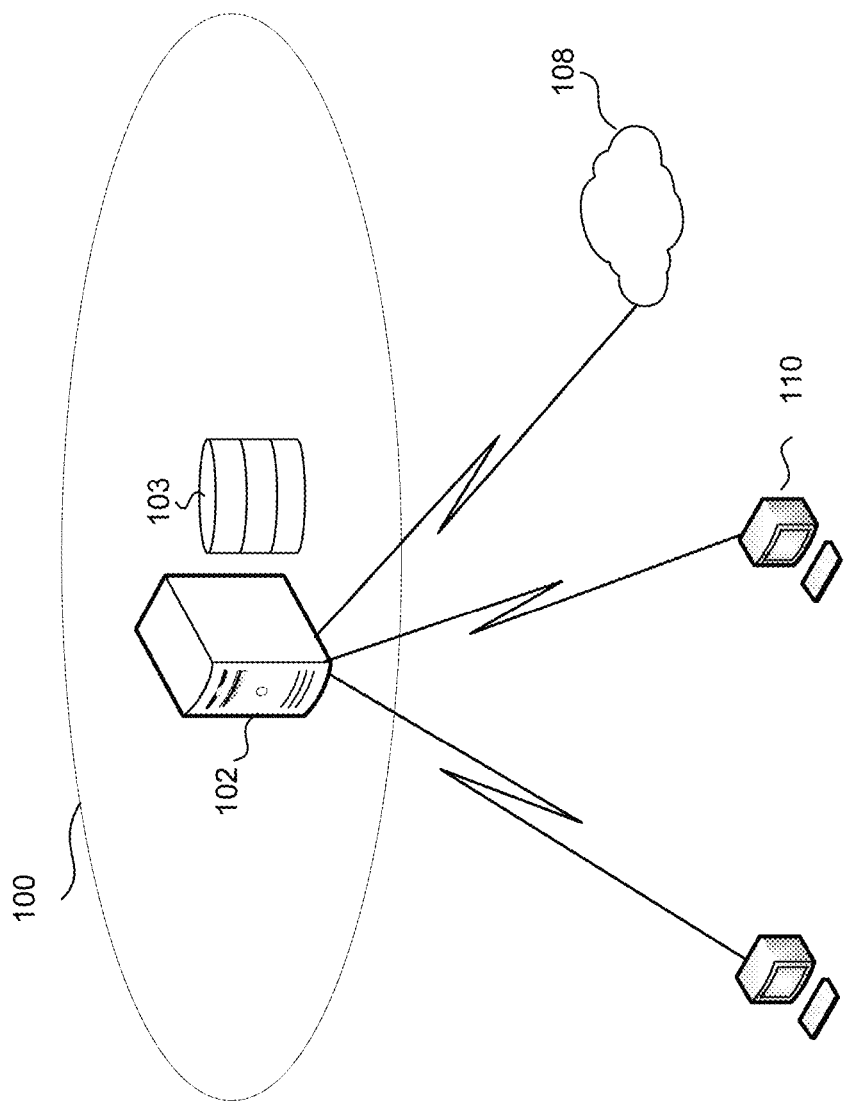
FIG. 1 is an illustration of a Paths system for organizing data from multiple platforms, according to some embodiments.

FIG. 1 illustrates a Paths social media/calendar content system 100 for aggregating social media/calendar content from a plurality of sources and owners. Paths system 100 can include a server 102 and a database 103. Paths system 100 can implement server 102 to gather and organize disjointed artifacts from a user's digital footprint and store the collection in database 103. Paths system 100 can collect information, including memories common to two or more users, from third party networks and platforms 108 to centralize all the fragmented pieces of a life's history.

Server 102 can include (i.e., be coupled to) a processor, and can be configured to connect operably to database 103. Server 102 can be configured to perform instructions to carry out social media importing, aggregation, modification and display. Database 103 can store elements of social media/calendar content such as one or more social media posts or objects and one or more content relationships.

According to some embodiments, Paths system 100 is configured to receive input from a first user of user system 110, which may include a source of social media/calendar content owned and/or accessed by the first user. In some embodiments, Paths system 100 is configured to query, via server 102, the first user for the login credentials and/or whether selected content is private or public. In some examples, Paths system 100 can be configured to identify one or more calendars (e.g., family, work, holidays, birthdays, team events, etc.) to retrieve content in relation to. Calendar data, such as event titles, dates, times, locations, description/notes, guests, calendar names, repeating status, repeating end date, attachments, associated URLs, etc., can be imported or created, and stored to one or more records of database 103.

Based on the information received, Paths system 100 can generate a Tandem Timeline comprising events and content to be displayed on user system 110 and/or a CollabTab interface for linking events to event guests and/or content co-owners.

In one non-limiting example, server 102 can perform operations to categorize elements or information in social media/calendar content relating to one or more events. In some embodiments, server 102 can be configured to retrieve information from one or more users to establish information about the events. In other embodiments, server 102 can be configured to perform natural language and/or machine learning processes to generate characterizations about the event. For example, server 102 may analyze a description of the event and characterize elements included therein, such as a noun, verb, etc. Then, server 102 can apply one or more pre-programmed grammatical rules. Alternatively, server 102 can perform operations to apply one or more trained rules, based on machine learning prediction algorithms, to discern metadata and/or descriptive features about one or more events provided in imported social media/calendar content.

Based on content analysis, server 102 can extract metadata and descriptive features from the content, e.g., the one or more social media posts. Server 102 can identify other users that may provide additional information, content, social media posts, etc. to enable system 100 to perform aggregation of social media/calendar content. Based on the content analysis, server 102 can also be configured to generate a common timeline. In some embodiments, server 102 can store aggregated content and generated timeline(s) in a searchable computer database, such as database 103.

According to some embodiments, recommendation system 100 can generate or cause to be displayed (e.g., on a display of user device 106) a graphical user interface that includes a Tandem Timeline and a CollabTab comprising features of the aggregated social media/calendar content.

Figure 2:
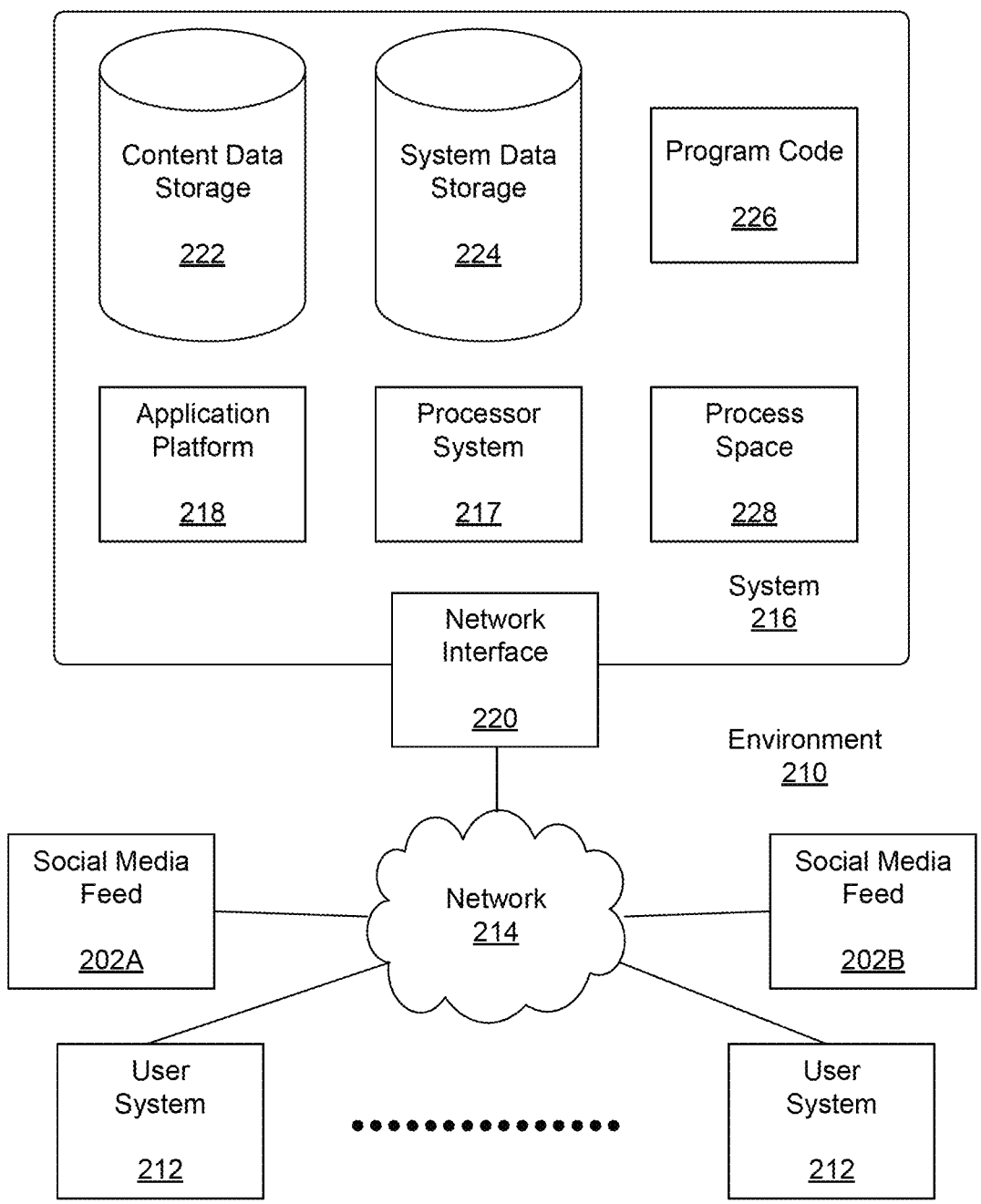
FIG. 2 is an illustration of an example Paths system for organizing data from multiple platforms, according to some embodiments.

One arrangement for elements of the system 100 is shown in FIG. 2, including the network interface 220, the application platform 218, the directed graph data storage 222 for storing a directed graph representation 223, the system data storage 224 for system data 225 accessible to the system 216, the program code 226 for implementing various functions of the system 216, and the process space 228 for executing natural language processes, and impact score analysis. As generally described above, in some embodiments, process space 228 can execute natural language processes to extract information about an event common to social media of two or more users, such as an event that is separately described on a first social media feed 202A of a first user and a second social media feed 202B of a second user. Additional processes that may execute on the system 216 include database indexing processes.

System 216 can include any device comprising a processor and memory. For example, system 216 can include a server that includes a memory coupled to a processor, the processor configured to execute instructions for organizing and aggregating social media/calendar content. Such instructions can include one or more processes to perform natural language processing techniques to extract metadata features and event information from one or more social media feeds (e.g., first and second social media feeds 202A and 202B).

Once metadata features and event information are identified, computing device 102 can identify relationships between events common between the social media feeds 202A and 202B, the relationships being implied by their respective metadata features or descriptive information contained in the respective social media/calendar content.

Computing device 102 can aggregate first and second social media feeds 202A and 202B and store the individual and/or aggregated content in content data storage 222. Computing device 102 can also generate, based on the relationships, a timeline commonly shared by first and second social media feeds 202A and 202B and corresponding to the aggregated content.

A database image (e.g., directed graph data storage 222) may include one or more database objects. A relational database management system (RDMS), NOSQL database, or the equivalent may execute storage and retrieval of information against the database object(s). The application platform 218 may be a framework that allows the applications of the system 216 to run, such as the hardware and/or software, e.g., the operating system. In an embodiment, the change management system service 216 may include the application platform 218 which enables creation, managing and executing one or more applications developed by the provider of the on-demand database service, users requesting changes or additions to social media/calendar content, including the aggregated social media/calendar content, through an interface provided via client device 106, or third-party application developers accessing the on-demand database service via the client device 106.

System 216 can include a user interface that includes, for example, a Tandem Timeline to permit access and management of content relative to any point in a user's life. In one non-limiting example, system 216 can provide a Tandem Timeline to be displayed on client device 106 to permit users to augment the aggregated social media/calendar content and produce a complete and precise narrative through simplified corroboration even when each individual user lacks complete information and/or resources.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTPS, FTP, AFS, WAP, etc. In an example where HTTPS is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers.

Several elements in the system shown in FIG. 2 include elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Edge browser, Google's Chrome browser, Opera's browser, or a WAP-enabled browser in the case of a cell phone, PDA or other wireless device, or the like, allowing a user of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 100 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 216 to intercommunicate and to process webpages, applications and other data and media content as described herein are, for example, downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 3:
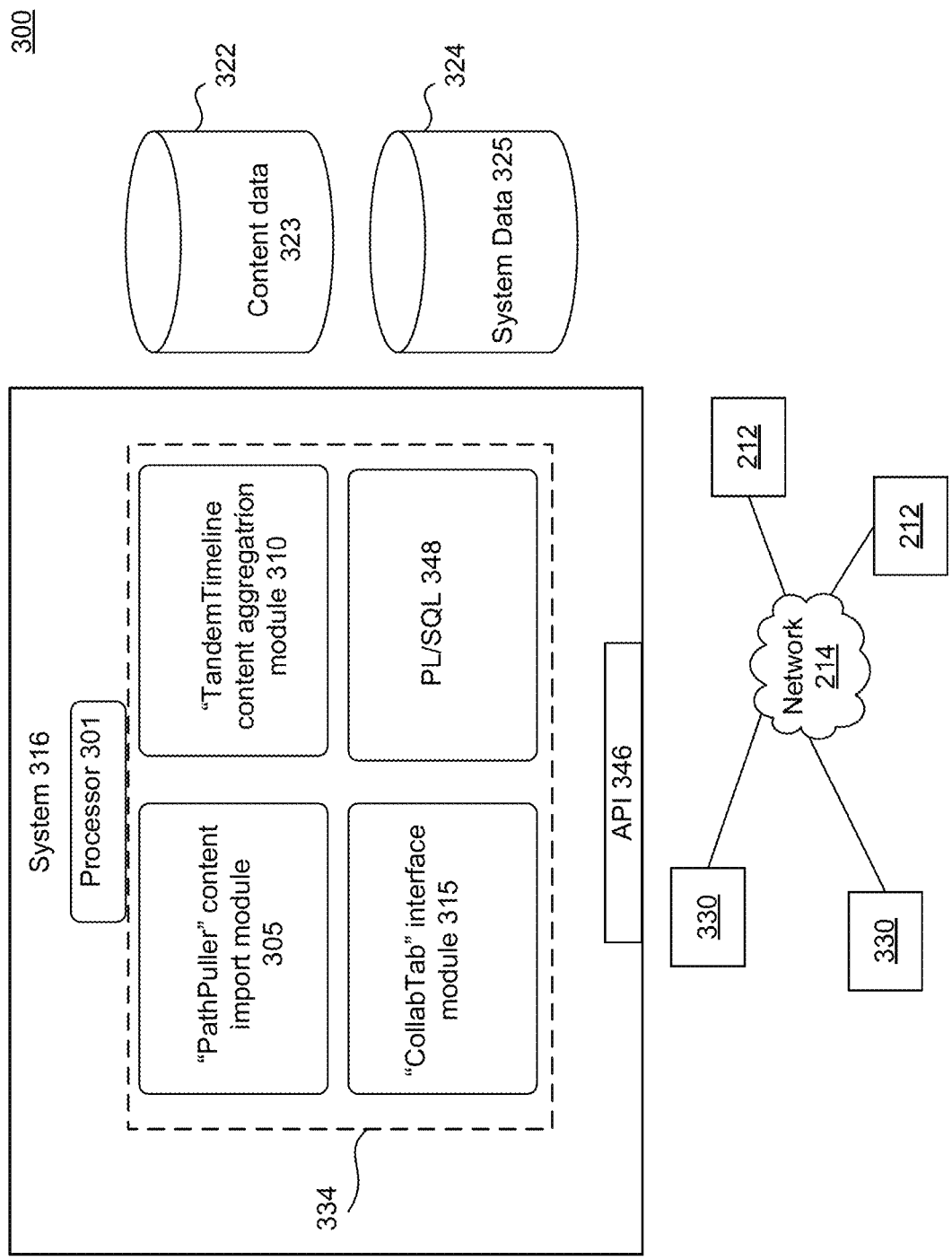
FIG. 3 is an illustration of an example Paths system for organizing data from multiple platforms, according to some embodiments.

System 316, shown in FIG. 3, implements a system for aggregating common events from social media/calendar content. For example, in one embodiment, the system 316 includes application servers configured to implement and execute software applications as well as provide related data, code, forms, webpages and other information to and from the user devices and to store to, and retrieve from, a database system related data, objects, and social media/calendar content. With a social media aggregation system, data for social media posts may be stored in the same physical database object and events common to two or more records can be identified and intermingled to facilitate analytics and user input to augment the aggregated content. For example, the system 316 may provide access to multiple hosted (standard and custom) applications, including social media aggregation service application(s).

In FIG. 3, each of the user systems 312 may include a processor system, a memory system, an input system, and an output system. FIG. 3 shows the network 314 and the system 316. FIG. 3 also shows that the system 316 may include the content data storage 322, content data 323, system data storage 324, system data 325, an Application Program Interface (API) 346, a PL/SQL 348, system process space 332, and social media aggregation process space 334, which can be an embodiment of process space 228, and can be configured to access system data storage 324 and the system data 325 therein, and content data storage 322 and the content data 323 therein to aggregate social media/calendar content 330 retrieved based on input from user systems 212. The process space 334 includes the PastPuller content import module 305 that supports importing and validating social media/calendar content retrieved from a variety of content feeds (such as MYSPACE, FACEBOOK, INSTAGRAM, and the like). Process space 334 additionally includes a Tandem Timeline content aggregation module 310 that supports aggregating social media posts and content, including content imported by PastPuller module 305, and generating a timeline common to each imported social media/calendar content. Process space 334 further includes a CollabTab interface module 315 that supports generation of an interface to be displayed on user systems 212 to permit a user to tab between content feeds and reduce the complexities of augmenting content based on multiple potentially disparate social media owners and sources. Invocations to such applications may be coded using the PL/SQL 348 that provides a programming language style interface extension to API 346. For example, API 346 can be configured to provide an interface between one or more of customer systems 316, third party integrations and other APIS, including but not limited to short message service (SMS) integrations, third party social media integrations, and the like. In other embodiments, the environment 300 may not have the same elements as those listed above and/or may have other elements instead of, or in addition to, those listed above.

The user systems 312, network 314, system 316, content data storage 322, and system data storage 324 can be embodiments of user systems 212, network 214, system 216, content data storage 222, and system data storage 224 discussed above in FIG. 2. System 316 may include the network interface 220 (of FIG. 2) implemented as a set of HTTP application servers, application platform 218 (of FIG. 2), content data storage 322, and system data storage 324.

Each application server 330 may be communicably coupled to database systems, e.g., having access to the system data 325 and the content data 323, via a different network connection. Transfer Control Protocol and Internet Protocol (TCP/IP) are typical protocols for communicating between application servers and the database system. However, it will be apparent to one skilled in the art that other transport protocols may be used to optimize the system depending on the network interconnect used. Because it is desirable to be able to add and remove application servers from the server pool at any time for any reason, there is no server affinity for a user and/or organization to a specific application server. In one embodiment, therefore, an interface system implementing a load balancing function (e.g., an F5 Big-IP load balancer) is communicably coupled between the application servers and the user systems 312 to distribute requests to the application servers. In one embodiment, the load balancer uses a least connections algorithm to route user requests to the application servers. Other examples of load balancing algorithms, such as round robin and observed response time, also may be used.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a content database may include a table that describes a user with fields for login and contact information, and the like. Another table might describe a social media/calendar content obtained from the social network feeds belonging to respective users and/or created natively through the Paths system.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 4:
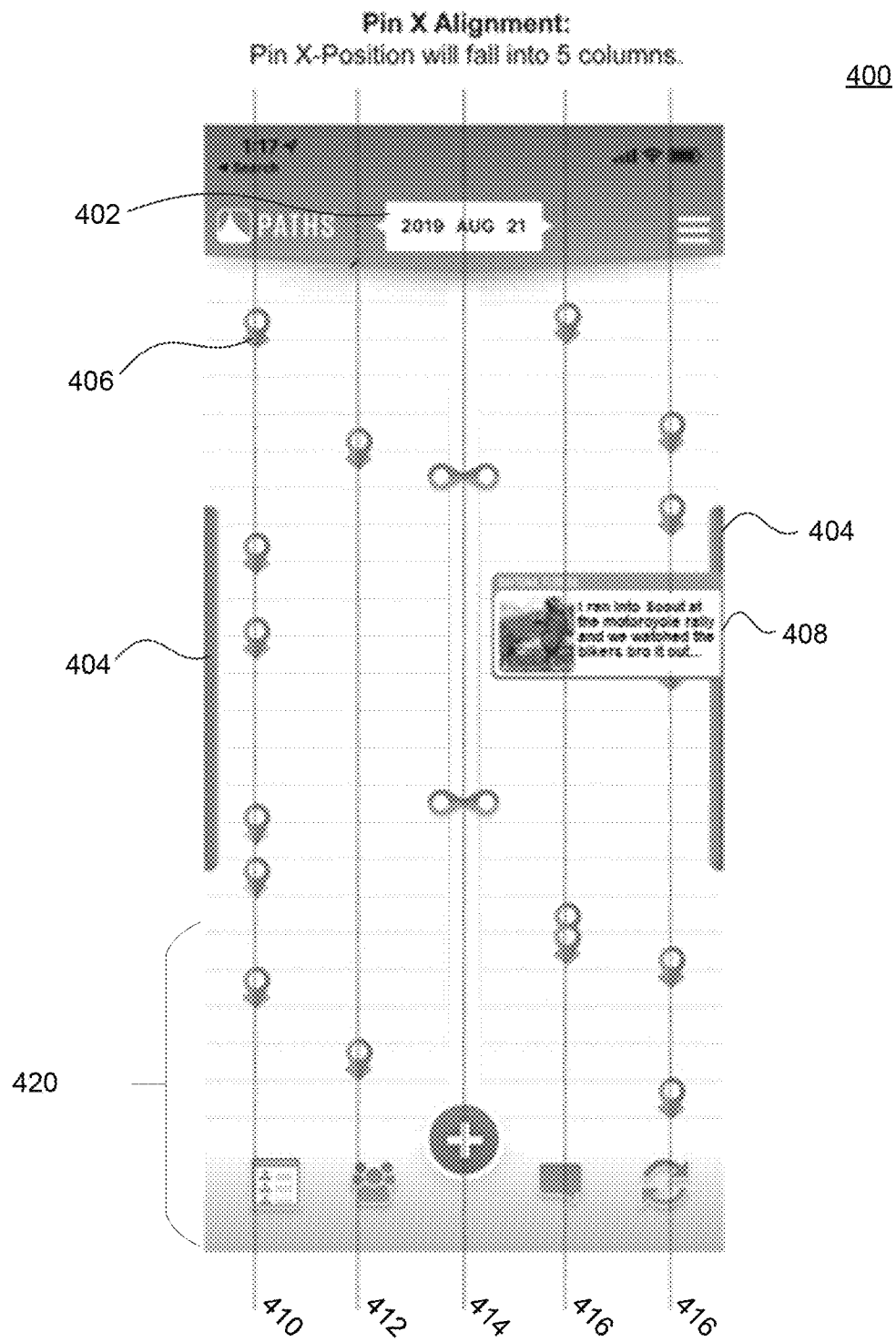
FIG. 4 is an illustration of a Tandem Timeline in an example Paths system for organizing data from multiple platforms, according to some embodiments.

FIG. 4 illustrates a Tandem Timeline graphical user interface (i.e., "Tandem Timeline") 400 of a Paths network, which may be an embodiment of Paths network 100.

According to some embodiments, Tandem Timeline 400 can provide a visualization of plural (e.g., dual) timelines. According to some embodiments, the right half of the Tandem Timeline represents a user's content and the left half represents filtration and/or content from other users, so that time comparisons can be made. In some embodiments, Tandem Timeline 400 permits pinch zooming so the user can drill down to a specific time period (e.g., a specific minute, hour, day, month, year, century, etc. This aspect permits a user to rapidly scroll into the past or the future. The objects on the timeline represent content that can link to posts.

As shown in FIG. 4, Tandem Timeline GUI 400 includes a date selector 402 permitting a user to specify a focus date (e.g., Aug. 21, 2019), a Tripwire 404, which focuses the GUI on the date specified in date field 402 and graphical elements (e.g., pins) 406 that provide a link to social media/calendar content arranged on Tandem Timeline 400 according to date (e.g., in a sequential order from newest to oldest).

Date selector 402 can be configured having a shape and/or dimensions that selector visually fits within a visual depiction of Tripwire 404. For example, date selector 402 can include triangular shapes, as shown, depicted to fit within wedge of the Tripwire 404 (swipe bar).

Tripwire 404 is configured to overlap and encompass the date (and time, if provided) selected in date selector 404. In some embodiments, the middle of Tripwire 404 is aligned to mark that exact date/time. According to some embodiments, TripWire 404 can be provided with a marker, such as a wedge, to mark the middle. According to some embodiments, TripWire 404 appears and functions as a level of zoom proximate to the specified date/time.

Pins 406 correspond to social media/calendar content having an associated date, and can be arranged in a sequence on the Tandem Timeline 400, such as based on the associated date from newest to oldest. In other embodiments, pins 406 can be arranged from oldest to newest. According to some embodiments, Tandem Timeline 400 can be partitioned (e.g., from left to right) into two or more columns. For example, as shown in FIG. 4, Tandem Timeline 400 is partitioned by five columns (e.g., columns 410 to 418). According to some embodiments, pins 406 are aligned with a specific column based on the source of the corresponding social media/calendar content.

In a non-limiting example, columns 410 to 418 can represent, from left to right, raw and modified social media/calendar content from, respectively, one or more invited users (PostGuests) and a host user (PostHost).

In some embodiments, each column (guest content or host content) can include a number (e.g., two or more) of sub-columns. The outside columns can represent unmodified (e.g., "untouched") posts imported from external social feeds, such as MYSPACE or FACEBOOK. Interior columns can represent content based on those external posts, but modified in Paths, as well as entries created natively in Paths. A center-most column can represent posts having CollabTabs, i.e., tabs coordinated based on users that have crossed paths at a given event.

For example, column 410 can represent raw, unmodified social media/calendar content imported into Paths from an invited user's social feed (such as a guest user's FACEBOOK or MYSPACE post, for example). Column 412 can represent those users' modified content as presented within Paths. Column 414 can represent the host user's CollabTab content, such as posts where the CollabTab interface has linked the host user's content to that of the other invited users. Column 416 can represent the host user's modified social media/calendar content, as presented within Paths. And column 418 can represent the host user's raw, unmodified social media/calendar content. filtered and/or one or more invited users' social media. Pins 406 that overlap column 410 can link to the host and guest users' social media/calendar content (imported, modified, and/or native in Paths)

According to some embodiments, sections 420 of the timeline that fall earlier than a date specified by the user in the date selector can be provided having a different graphical style than dates falling within the frame of the Tripwire 404. For example, sections 420 can be configured to have a different background color, shading, one or more color gradients, shaded, Tandem Timeline 400 enables a user to identify posts they may have previously managed or improved, and identify which posts require additional attention. For example, the user's imported MYSPACE memory dump posts will be represented by pins 406 on column 418. If the user modifies the post, it becomes an official Paths entry, such that a pin 406 corresponding to the modified Paths entry shifts toward center to column 416. If the user collaborates on the post with their entry added to the CollabTab, then the pin literally spans over to the centermost column (e.g., column 414) to represent the crossing of paths.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 5A:
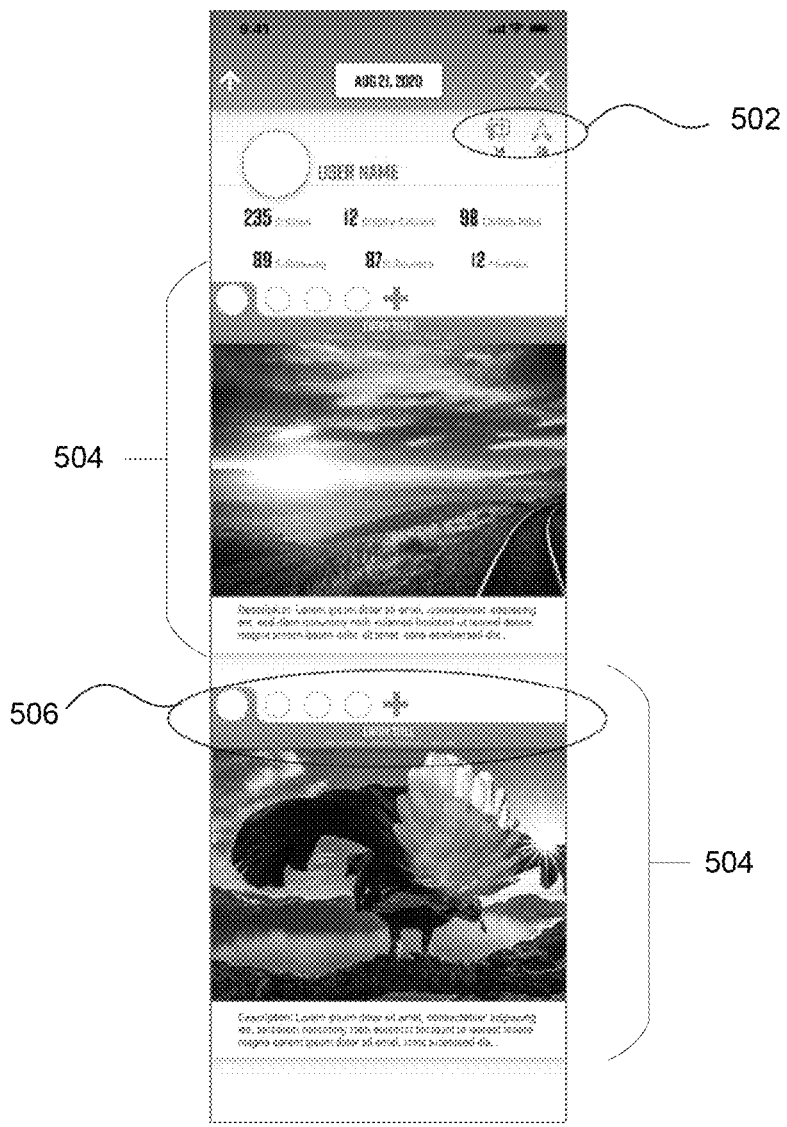
FIGS. 5A and 5B are illustrations of a content page including a CollabTab of an example Paths system for organizing data from multiple platforms, according to some embodiments.

FIG. 5A depicts a personal feed graphical user interface 500A having a "CollabTab" element in a Paths network, which may be an embodiment of Paths network 100. The CollabTab 506 includes an interface for posts 504 on Paths that are "co-owned" by multiple contributors who may each add an entry corresponding to the post. In some embodiments, the CollabTab 506 is an element that includes a tab that appears horizontally across the top of a Paths post 504. CollabTab 506 provides a tab-based navigation item that allows users to toggle between collaborative co-contributors to a Paths social post 504, resulting in co-ownership of the post. As shown in FIG. 5A, user interface 500A can include navigation items 502 that include links to Teachable Takeaway and Gratitude Journal post elements.

Figure 5B:
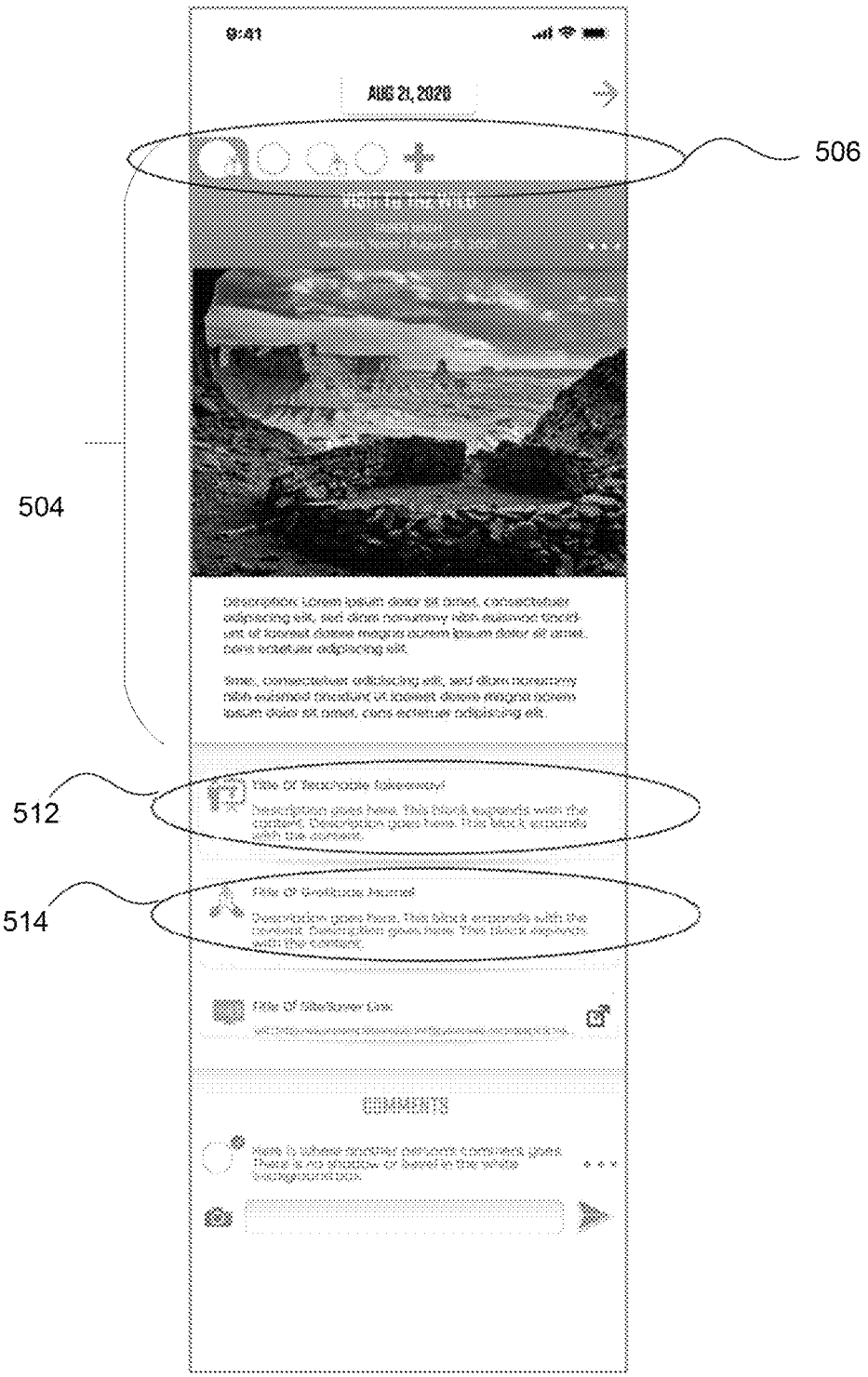

FIG. 5B depicts a Paths social post graphical user interface 500B including additional details of a co-owned CollabTab post 504. Interface 500B depicts the details of the post having been selected from a feed depicted in FIG. 5A. As above, interface 500B can include post 504 coupled to a "CollabTab" 506 element in a Paths network, which may be an embodiment of Paths network 100. User interface 500B further includes elements, such as Teachable Takeaway element 512 and Gratitude Journal 514.

Teachable Takeaway element 512 provides a field through which each collaborative user can note a learning or lesson based on the content of post 504, captured in the given entry. On separate screens linked from navigation items 502 of interface 500A, the Teachable Takeaway note can be indexed in a single list of notes from other entries for insightful review so the user can accrue wisdom over time.

Gratitude Journal element 514 provides a field in which each user can submit a note to demonstrate appreciation from a given moment/entry/post, resulting in a growing list of gratitude over time. As with Teachable Takeaway element 512, each Gratitude Journal note can be indexed in a single list of notes accessed from navigation items 502 of interface 500A.

Figure 6:
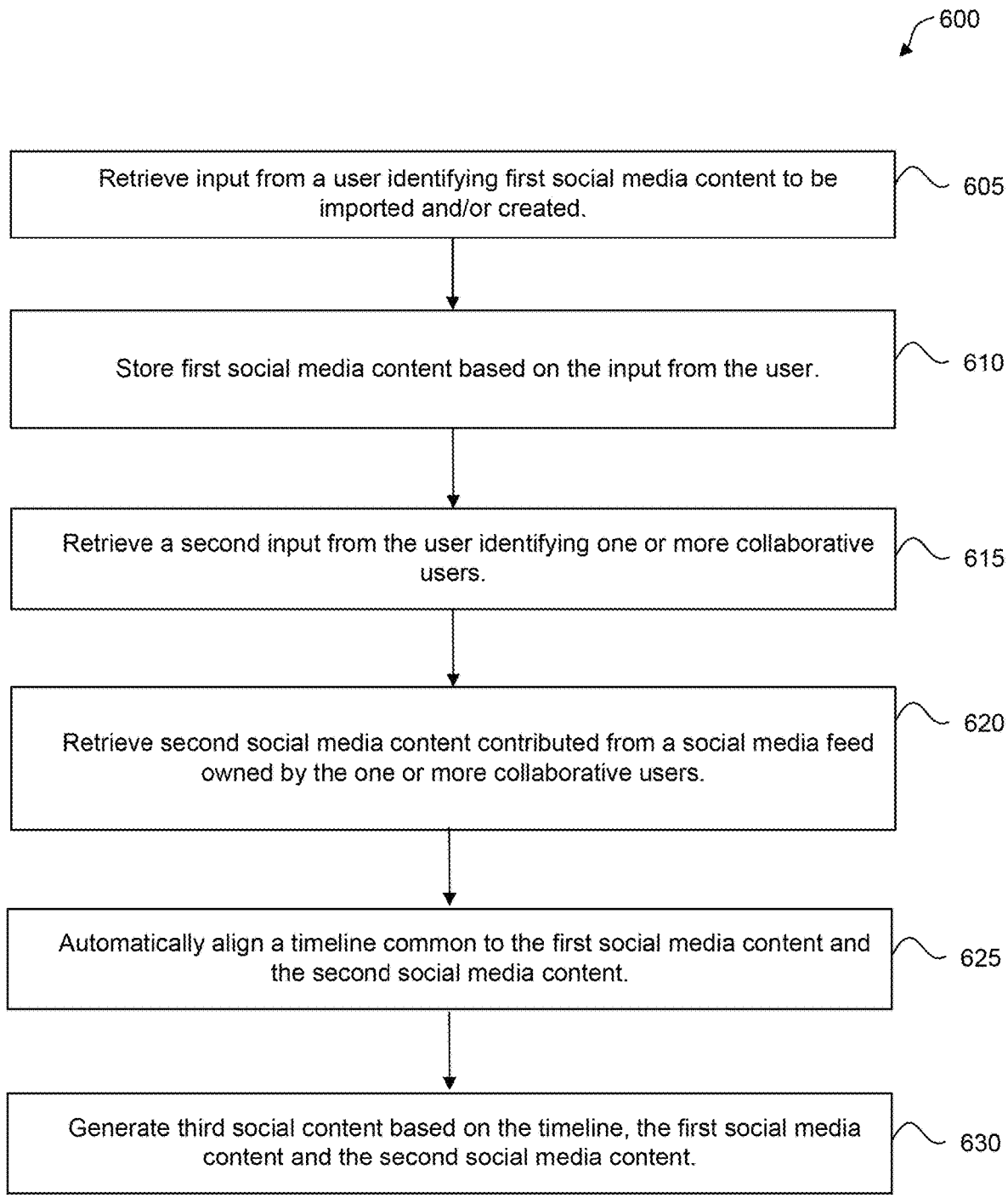
FIG. 6 is a flow diagram of a method for organizing data from multiple platforms, according to some embodiments.

FIG. 6 is a flow diagram of a method 600 for organizing data from multiple social media networks and platforms according to some embodiments of the present disclosure. In some embodiments, method 600 provides operational steps to identify common elements, such as a date and elements linking separate social media/calendar content to a single event. In some embodiments, method 600 performs automated processes to determine a relationship between separate social media/calendar content, including social media/calendar content imported from the feeds of different users. Based on the disclosure herein, operations in method 600 can be performed in a different order and/or vary.

At operation 605, a computing device can receive an input from a user identifying first social media/calendar content to be imported and/or created. For example, at 610, a computing device can retrieve from a user information about first social media/calendar content to enable the computing device to retrieve the content. For example, Paths may request proper login credentials, information about whether the content is public or private, which calendar inside a serving account that the user wants to pull from, names to associate with the content to be imported, etc.

At operation 610, the computing device can store or cause to be stored first social media/calendar content based on the input from the user. For example, the computing device may retrieve social media/calendar content that includes an event title, date, time, location, description/note, guests, an associated calendar name, whether the event occurred all-day status, a repeating status and end date, an attachment list, a URL, etc.

Also, at operation 610, the user may choose to augment data corresponding to the social media/calendar content. For example, the user may add, delete, or modify elements of the content including the event title, date, time, location, description/note, guests, an associated calendar name, whether the event occurred all-day status, a repeating status and end date, an attachment list, a URL, etc.

At operation 615, the computing device can retrieve a second input from the user identifying one or more collaborative users, i.e., other users from whom the host user wishes to acquire additional information pertaining to an event encompassed by the first social media/calendar content. For example, at 615, the host user may invite other collaborators. The user may access a CollabTab element associated with the imported first social media/calendar content and perform a request via the CollabTab to open the CollabTab to other collaborators (PostGuests). A symbol (e.g., a plus symbol) on the CollabTab may indicate whether the post is open to PostGuests or not. In some embodiments, upon an invitation by the host user, one or more PostGuests may be automatically added to the post (e.g., the CollabTab) by the computing device.

At operation 620, the computing device can retrieve second social media/calendar content contributed from a social media feed owned by the one or more collaborative users. According to some embodiments, the computing device may access social media/calendar content provided from one or more social media services, the content belonging to a PostGuest. In other embodiments, the PostGuest may directly contribute and/or augment the social media/calendar content via the CollabTab interface.

At operation 625, the computing device can align a timeline common to the first social media/calendar content and the second social media/calendar content. For example, at 625, the computing device can determine an event date common to the first and second social media/calendar content. In some embodiments, 625 includes populating a TandemTimeline based on a common event date. For example, operation 625 can include generating a TandemTimeline that includes the first and second social media/calendar content based on proximity to a selected date.

At operation 630, the computing device can generate third social content based on the timeline, the first social media/calendar content and the second social media/calendar content. For example, the computing device can populate a Tandem Timeline (which may be, for example, an embodiment of Tandem Timeline 400) published based on any of the first and second social media/calendar content. As at operation 625, the generated third social media/calendar content can be aligned to the first and second social media/calendar content based on an event date (e.g., an event date that is proximate to a date selected in the Tandem Timeline interface.

Figure 7:
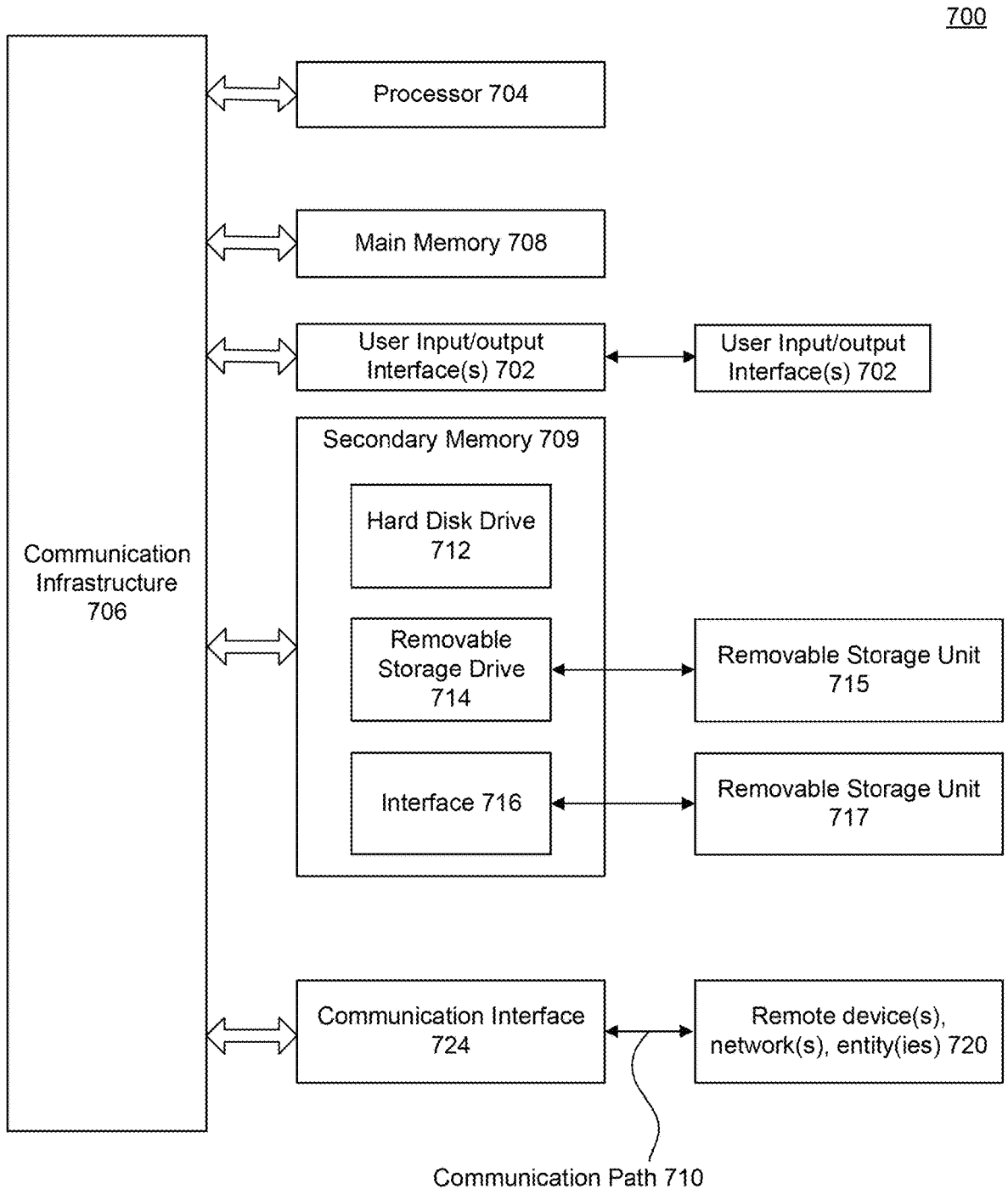
FIG. 7 is block diagram of example components of a computing system according to an embodiment.

FIG. 7 is a block diagram of example components of device 700. One or more computer systems 700 may be used, for example, to implement any of the embodiments discussed herein, as well as combinations and sub-combinations thereof. Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 308, such as random access memory (RAM). Main memory 308 may include one or more levels of cache. Main memory 308 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714.

Removable storage drive 714 may interact with a removable storage unit 718. Removable storage unit 718 may include a computer-usable or readable storage device having stored thereon computer software (control logic) and/or data. Removable storage unit 718 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 308, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A computer-implemented method for dynamically displaying memory cues comprising aggregated social media/calendar content in a graphical user interface (GUI), the method comprising:
    displaying a date selector configured to retrieve an input from a user, the input comprising information about a selected date of interest to the user;
    retrieving first memory cues comprising first social media/calendar content associated with the user from one or more social media services;
    displaying a first graphical element corresponding to the user content containing the retrieved first social media/calendar content within a first portion of the GUI on a computer screen;
    retrieving second memory cues comprising second social media/calendar content associated with one or more other users from the one or more social media services;
    displaying a second graphical element corresponding to the one or more other users' content containing the retrieved second social media/calendar content within a second portion of the GUI on a computer screen; and
    automatically applying a content organization process, executed by a processor, to dynamically display aggregated social media/calendar content within the GUI, the process comprising:
    a) analyzing the retrieved first and second social media/calendar content based on time stamps or event dates;
    b) determining the chronological order of the analyzed content;
    c) grouping and organizing the analyzed content based on temporal proximity and relevance to the selected date;
    d) generating a Tandem Timeline being a unified display element within the GUI that presents shared memory cue content comprising the organized social media/calendar content while preserving the chronological order, wherein the Tandem Timeline visually represents the first and second social media/calendar content along a visual timeline axis, wherein the Tandem Timeline is configured to enable a plurality of users to modify the first and second social media/calendar content, the plurality of users comprising the user and the one or more other users, and wherein the user interacts with the Tandem Timeline to cause the GUI to navigate temporally through the first and second social media/calendar content; and e) generating a CollabTab feature graphical element within the GUI, wherein the user interacts with the CollabTab feature graphical element to cause the GUI to navigate between the first and second graphical elements corresponding collectively to the shared memory cue content, wherein the CollabTab enables collaboration of the shared memory cue content, wherein the CollabTab graphical element comprises a plurality of tabs, each tab of the plurality of tabs being associated with a unique memory cue content contributor selected from the plurality of users, wherein the CollabTab permits the user to toggle between contributions from each memory cue content contributor.

2. The computer-implemented method of claim 1, further comprising:
dynamically relocating and re-aligning, by a processor, the first graphical element within the first portion and the second graphical element within the second portion based on a change to the selected date.

3. The computer-implemented method of claim 1, further comprising:
receiving first modified social media/calendar content, from the user, comprising one or more changes, additions, and/or deletions to the retrieved first social media/calendar content; and
displaying a third graphical element corresponding to the first modified social media/calendar content comprising the changes, additions, and/or deletions to the retrieved first social media/calendar content within a third portion of the GUI on a computer screen; and
automatically locating, by the processor, the third graphical element within the third portion of the GUI and aligning the third graphical element to the first and second graphical elements based on proximity to the selected date.

4. The computer-implemented method of claim 3, further comprising:
dynamically relocating and re-aligning, by the processor, the third graphical element within the third portion of the GUI based on a change to the selected date.

5. The computer-implemented method of claim 3, further comprising:
receiving second modified social media/calendar content, from the one or more other users, comprising one or more changes, additions, and/or deletions to the retrieved second social media/calendar content; and
displaying a fourth graphical element within a fourth portion of the GUI on a computer screen, the fourth graphical element corresponding to the second modified social media/calendar content comprising the changes, additions, and/or deletions to the retrieved second social media/calendar content; and
automatically locating, by the processor, the fourth graphical element within the fourth portion of the GUI and aligning the fourth graphical element to the first to third graphical elements based on proximity to the selected date.

6. The computer-implemented method of claim 5, further comprising:
dynamically relocating and re-aligning, by a processor, the fourth graphical element within the fourth portion of the GUI based on a change to the selected date.

7. The computer-implemented method of claim 6, further comprising:
generating aggregated social media/calendar content based on the first modified social media/calendar content and the second modified social media/calendar content;
displaying a fifth graphical element corresponding to the aggregated social media/calendar content within a fifth portion of the GUI on a computer screen; and
automatically locating, by the processor, the fifth graphical element within the fifth portion of the GUI, and aligning, by the processor, the fifth graphical element to the first to fourth graphical elements based on proximity to the selected date.

8. A computer-implemented method for dynamically displaying aggregated social media/calendar content in a graphical user interface (GUI), the method comprising:
displaying a date selector configured to retrieve an input from a user, the input comprising information about a selected date of interest to the user;
retrieving first memory cues comprising first social media/calendar content associated with the user from one or more social media services, the first social media/calendar content comprising first information about an event and an event date corresponding to the event;
retrieving second memory cues comprising second social media/calendar content associated with one or more other users from the one or more social media services, the second social media/calendar content comprising second information about the event and the event date;
generating third social media/calendar content based on the first social media/calendar content and the second social media/calendar content, wherein the third social media/calendar content includes the first information and the second information; and
applying a content organization process, executed by a processor, to dynamically display aggregated social media/calendar content within the GUI, the process comprising:

a) analyzing the retrieved first and second social media/calendar content based on time stamps or event dates;
b) determining the chronological order of the analyzed content;
c) grouping and organizing the analyzed content based on temporal proximity and relevance to the selected date; and
d) generating a Tandem Timeline being a unified display element within the GUI that presents shared memory cue content comprising the organized social media/calendar content while preserving the chronological order, wherein the Tandem Timeline visually represents the first and second social media/calendar content along a visual timeline axis, wherein the Tandem Timeline is configured to enable a plurality of users to modify the first and second social media/calendar content, the plurality of users comprising the user and the one or more other users, and the memory cue content representing a co-owned post displayed in the graphical user interface, and wherein the user interacts with the Tandem Timeline to cause the GUI to navigate temporally through the first and second social media/calendar content such that the computer-implemented method displays one or more first graphical elements corresponding to the third social media/calendar content within a central portion of the GUI on a computer screen and one or more second graphical elements within one or more lateral portions of the GUI on the computer screen, the one or more second elements corresponding to one or more of the first social media/calendar content and the second social media/calendar content; and e) generating a CollabTab graphical element within the GUI, wherein the user interacts with the CollabTab graphical element to cause the GUI to navigate between the first and second graphical elements corresponding collectively to the shared memory cue content, wherein the CollabTab enables collaboration of the shared memory cue content, wherein the CollabTab graphical element comprises a plurality of tabs, each tab of the plurality of tabs being associated with a unique memory cue content contributor selected from the plurality of users, wherein the CollabTab permits the user to toggle between contributions from each memory cue content contributor.

9. The computer-implemented method of claim 8, wherein the CollabTab graphical element comprises the one or more first graphical elements and the one or more second graphical elements.

10. The computer-implemented method of claim 9, wherein the one or more first graphical elements comprises one or more first hyperlink directing the user to a first web page comprising information associated with the third social media/calendar content and the one or more second graphical elements comprises one or more second hyperlinks directing the user to a second web page comprising information associated with the second social media/calendar content.

11. The computer-implemented method of claim 8, further comprising:
receiving a second input from the user, the second input comprising a selection of one of the one or more first graphical elements; and
displaying the third social media/calendar content in a new window of the GUI based on the second input, the third social media/calendar content comprising third information about the event aggregated from the first and second social media/calendar content.

12. The computer-implemented method of claim 11, further comprising:
displaying one or more third graphical elements in the GUI, the one or more third graphical elements comprising:
a first hyperlink to the first social media/calendar content; and
a second hyperlink to the second social media/calendar content,
wherein the first and second social media/calendar content are associated with the event.

13. The computer-implemented method of claim 8, further comprising:
storing the first social media/calendar content, the second social media/calendar content, and the third social media/calendar content in a database coupled to the processor.

14. The computer-implemented method of claim 8, further comprising:

receiving first login credentials from the user, the login credentials enabling access to the first social media/calendar content from the one or more social media services; and
receiving second login credentials from the one or more other users, the login credentials enabling access to the second social media/calendar content from the one or more social media services.

15. A system for dynamically displaying aggregated social media/calendar content in a graphical user interface (GUI), comprising:
a server, coupled to a processor, and configured to execute instructions that:
display a date selector configured to retrieve an input from a user, the input comprising information about a selected date of interest to the user;
retrieve first memory cues comprising first social media/calendar content associated with the user from one or more social media services;
display a first graphical element corresponding to the user content containing the retrieved first social media/calendar content within a first portion of the GUI on a computer screen;
retrieve second memory cues comprising second social media/calendar content associated with one or more other users from the one or more social media services;
display a second graphical element corresponding to the one or more other users' content containing the retrieved second social media/calendar content within a second portion of the GUI on a computer screen; and
automatically apply a content organization process, executed by a processor, to dynamically display aggregated social media/calendar content within the GUI, the process comprising:
a) analyzing the retrieved first and second social media/calendar content based on time stamps or event dates;
b) determining the chronological order of the analyzed content;
c) grouping and organizing the analyzed content based on temporal proximity and relevance to the selected date; and
d) generating a Tandem Timeline being a unified display element within the GUI that presents shared memory cue content comprising the organized social media/calendar content while preserving the chronological order, wherein the Tandem Timeline visually represents the first and second social media/calendar content along a visual timeline axis, wherein the Tandem Timeline is configured to enable a plurality of users to modify the first and second social media/calendar content, the plurality of users comprising the user and the one or more other users, and the memory cue content representing a co-owned post displayed in the graphical user interface, and wherein the user interacts with the Tandem Timeline to cause the GUI to navigate temporally through the first and second social media/calendar content; and
e) generating a CollabTab graphical element within the GUI, wherein the user interacts with the Collab Tab graphical element to cause the GUI to navigate between the first and second graphical elements corresponding collectively to the shared memory cue content, wherein the CollabTab enables collaboration of the shared memory cue content, wherein the CollabTab graphical element comprises a plurality of tabs, each tab of the plurality of tabs being associated with a unique memory cue content contributor selected from the plurality of users, wherein the Collab Tab permits the user to toggle between contributions from each memory cue content contributor.

16. The system of claim 15, the server further configured to execute instructions that:
dynamically relocate and re-align the first graphical element within the first portion and the second graphical element within the second portion based on a change to the selected date.

17. The change management system of claim 16, the server further configured to execute instructions that:
receive first modified social media/calendar content, from the user, comprising one or more changes, additions, and/or deletions to the retrieved first social media/calendar content; and
display a third graphical element corresponding to the first modified social media/calendar content comprising the changes, additions, and/or deletions to the retrieved first social media/calendar content within a third portion of the GUI on a computer screen; and
automatically locate the third graphical element within the third portion of the GUI aligned to the first and second graphical elements based on proximity to the selected date.

18. The change management system of claim 17, the server further configured to execute instructions that:
dynamically relocate and re-align the third graphical element within the third portion of the GUI based on a change to the selected date.

19. The change management system of claim 16, the server further configured to execute instructions that:
receive second modified social media/calendar content, from the one or more other users, comprising one or more changes, additions, and/or deletions to the retrieved second social media/calendar content; and
display a fourth graphical element within a fourth portion of the GUI on a computer screen, the fourth graphical element corresponding to the second modified social media/calendar content comprising the changes, additions, and/or deletions to the retrieved second social media/calendar content; and
automatically locate the fourth graphical element within the fourth portion of the GUI and align the fourth graphical element to the first to third graphical elements based on proximity to the selected date.

20. The change management system of claim 16, the server further configured to execute instructions that:
generate aggregated social media/calendar content based on the first modified social media/calendar content and the second modified social media/calendar content;
display a fifth graphical element corresponding to the aggregated social media/calendar content within a fifth portion of the GUI on a computer screen; and
automatically locate the fifth graphical element within the fifth portion of the GUI, and align the fifth graphical element to the first to fourth graphical elements based on proximity to the selected date.

21. A computer-implemented method according to claim 1, wherein the retrieving the first and second memory cues comprises retrieving the first and second memory cues from one or more social media platforms using a PathPuller module, wherein the PathPuller module is configured to import historical social media content and integrate it with integrated memory cue content.

* * * * *